United States Patent [19]

Huang

[11] Patent Number: 4,811,342

[45] Date of Patent: Mar. 7, 1989

[54] HIGH SPEED ANALOG ECHO CANCELLER

[75] Inventor: Zheng F. Huang, Fort Lauderdale, Fla.

[73] Assignee: Racal Data Communications Inc., Sunrise, Fla.

[21] Appl. No.: 797,280

[22] Filed: Nov. 12, 1985

[51] Int. Cl.$^4$ .............................................. H04B 3/23
[52] U.S. Cl. ..................................... 370/32.1; 379/411
[58] Field of Search ................................ 370/32, 32.1; 179/170.2, 170.6, 170.8; 379/406, 410, 411, 399; 375/14, 15

[56] References Cited

U.S. PATENT DOCUMENTS

| | | | |
|---|---|---|---|
| 3,499,999 | 3/1970 | Sondhi . | |
| 3,500,000 | 3/1970 | Kelly, Jr. et al. . | |
| 3,535,473 | 10/1970 | Flanagan et al. | 379/410 |
| 3,647,923 | 3/1972 | Thomas . | |
| 3,723,911 | 3/1973 | Forney, Jr. | 333/18 |
| 3,735,055 | 5/1973 | Thomas | 379/410 |
| 3,836,734 | 9/1974 | Campanella et al. | 379/411 |
| 4,064,379 | 12/1977 | Horna | 379/411 |
| 4,072,830 | 2/1978 | Gitlin et al. . | |
| 4,144,173 | 3/1979 | Oshima et al. . | |
| 4,362,909 | 12/1982 | Snijders et al. . | |
| 4,394,767 | 7/1983 | Shum | 333/13 |
| 4,400,790 | 8/1983 | Chambers et al. | 364/604 |
| 4,411,006 | 10/1983 | Horna | 375/102 |
| 4,417,317 | 11/1983 | White et al. | 364/825 |
| 4,425,483 | 1/1984 | Lee et al. | 379/411 |
| 4,464,746 | 8/1984 | Sniders et al. | 379/32 |
| 4,484,322 | 11/1984 | Fossati et al. | 370/32 |
| 4,578,544 | 3/1986 | de Verdiere et al. | 379/410 |
| 4,621,172 | 11/1986 | Kanemasa et al. | 370/32.1 |

FOREIGN PATENT DOCUMENTS 2021363 5/1979 United Kingdom .
0122594 4/1984 United Kingdom .

OTHER PUBLICATIONS

"Performance of an Adaptive Echo Canceller Operating in a Noisy, Linear, Time-Invariant Environment", J. R. Rosenberger et al., Bell System Technical Journal, vol. 50, No. 3, Mar. 1971, pp. 785–813.
"Nonlinear Echo Cancellation of Data Signals", By Agazzi et al., IEE Transactions on Communications, vol. COM-30, No. 11, Nov. 1982.
"Silencing Echoes on the Telephone Network", by Sondhi et al., Proceedings of the IEEE, vol. 68, No. 8, Aug. 1980.
"Large Scale Integration of Hybrid-Method Digital Subscriber Loops", by Agazzi et al., IEEE, 1982.
"Echo Cancellation of Voiceband Data Signals Using Recursive Least Squares and Stochastic Gradient Algorithms", by Honig, IEEE Transactions on Communications, vol. COM-33, No. 1, Jan. 1985.

*Primary Examiner*—Jin F. Ng
*Assistant Examiner*—Randall S. Vaas
*Attorney, Agent, or Firm*—Jerry A Miller

[57] ABSTRACT

An echo canceller stores echo signals in a plurality of sample and hold circuits. These echo signals are selectively switched to the input of a summing amplifier for subtraction from a data plus echo signal. A training sequence detector is utilized to detect the statistical occurrence of a predetermined training signal embedded within a stream of data. The echo canceller requires no analog to digital conversion or digital processor and operates at very high speeds. The circuit may be implemented in integrated circuit form at very low cost.

2 Claims, 4 Drawing Sheets

HIGH SPEED ANALOG ECHO CANCELLER

BACKGROUND

1. Field of the Invention

This invention relates generally to the field of echo control devices and more particularly to the field of high speed analog echo control devices such as echo cancellers.

2. Background of the Invention

On the past there have been basically two approaches to providing control over echoes for local telephone loops. The analog techniques generally involved use of various filtering arrangements which essentially provided impedance matching to the telephone line in order to reduce echoes. Such filtering schemes however are somewhat temperamental and are not readily adaptive to the frequent changes to the impedance characteristics of the transmission line. For example, temperature and humidity as well as wind, rain, snow and changing line terminations can all affect the impedance characteristics which are being corrected by a typical analog echo canceller. It is, therefore, very difficult to accommodate the very wide range of impedances which may be seen by such an echo suppressor, since a wide variety of impedances may be present on a transmission line. Since it is desirable to provide echo suppression in the order of 50 to 60 DB, analog echo suppression devices have been largely abandoned in favor of more effective digital techniques.

In a digital echo canceller, a representation of an echo signal is normally stored in memory and appropriately deleted mathematically from incoming data. Digital echo cancellers are able to effectively provide the required attenuation of echo signals but have drawbacks of their own. For example, in order to achieve a very high degree of echo cancellation, such digital echo cancellers require a highly accurate analog to digital converter and digital to analog converter. Such echo cancellers also require use of a reasonably powerful processor to manipulate the echo signal and data signal appropriately to achieve echo cancellation. While in general this is not a disadvantage for typical low speed data lines, owing to the recent advances in these technologies which allow for reasonably inexpensive computer elements, such items represent a major cost in higher speed environments.

In order to achieve approximately 50 to 60 DB of echo cancellation an analog-to-digital converter and digital to analog converter must have at least 12 bits of accuracy. For a digital echo control device to operate above approximately 50 to 100 KBPS, the cost of such high accuracy digital to analog converters which wil function at this data rate becomes prohibitive. Moreover, very high speed processors are also required at such speeds to provide digital echo cancellation. The present invention overcomes these drawbacks in an echo control device whichis capable of operation at extremely high speeds using analog technology. No digital-to-analog or analog-to-digital conversion is required. Microprocessors or microcomputers may also not be required (but may be desirable for various control functions) to provide a high degree of echo cancellation which can readily adapt to changing transmission line conditions.

SUMMARY OF THE INVENTION

It is an object of the present invention to provide an improved echo canceller.

It is another object of the present invention to provide an echo control device which requires no analog-to-digital conversion and which is capable of automatically updating itself in response to changes in transmission line conditions.

It is another object of the present invention to provide an echo control device which utilizes the statistical occurrence of a particular data pattern as a training pattern thereby reducing protocol overhead.

It is a further object of the present invention to provide a high speed echo canceller for local telephone loop circuits and the like which utilizes analog technology in order to allow for integration into an integrated circuit.

These and other objects of the invention will become apparent to those skilled in the art upon consideration of the following description of the invention.

In one embodiment of the present invention an echo control device includes a data input circuit for receiving data for outbound transmission over a transmission medium. A receiving circuit receives inbound data from the transmission medium. A capacitor is used for storing a sample of an echo signal and a subtractor selectively subtracts the stored sample of the echo signal from the inbound data.

In another embodiment of the present invention an apparatus for conditioning an echo control device includes a data input circuit for receiving input data for transmission over a transmission medium. A receiving circuit receives an echo signal from the transmission medium and an echo controller is operatively coupled to the transmission medium. A detector is responsive to input data for detecting a predetermined pattern occurring in the input data and the echo control device is conditioned to characteristics of the transmission medium in response to the detecting device. In this manner, the statistical occurrence of a predetermined data pattern is utilizes a training sequences.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
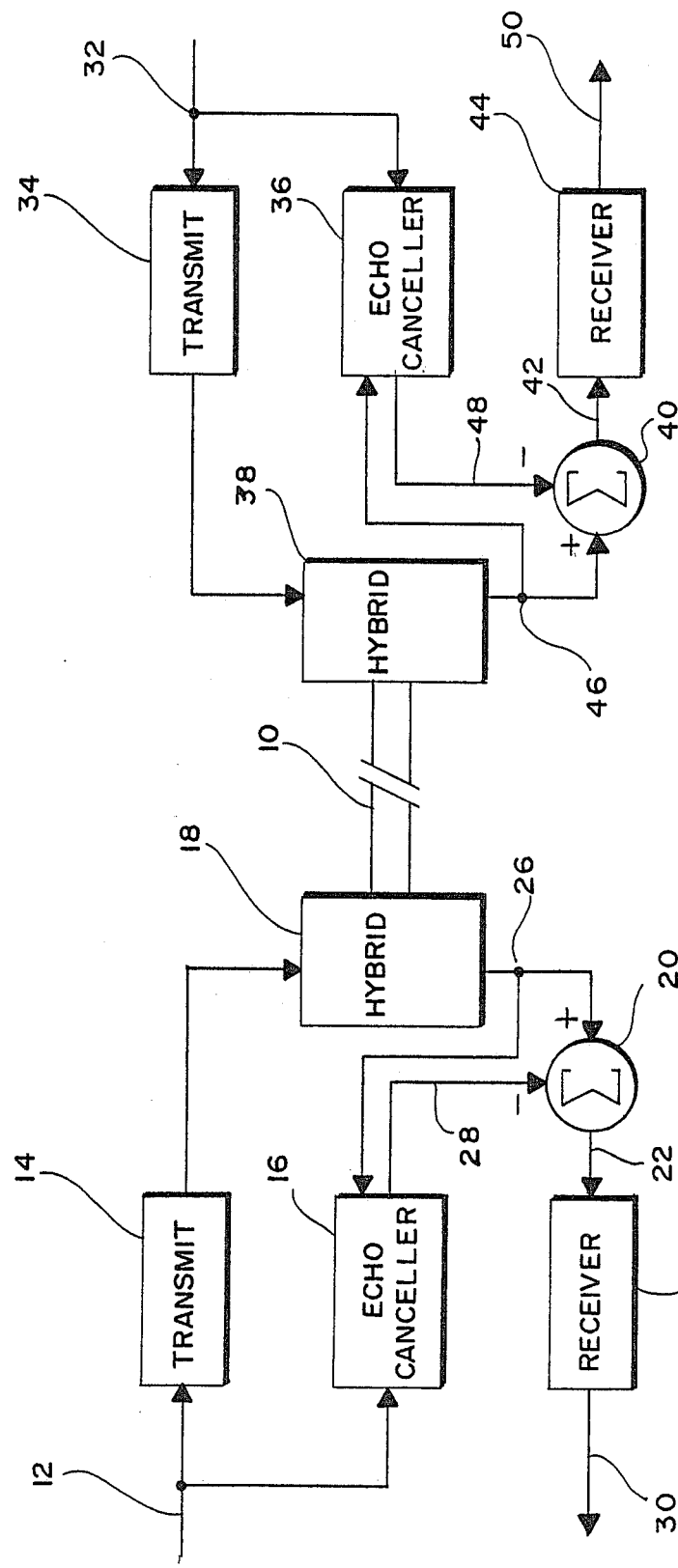
FIG. 1 shows an overall block diagram of a transmission system incorporating echo cancellation.

Turning now to FIG. 1 a data communication system utilizing echo cancellation according to the present invention is shown. In the system of FIG. 1, full duplex transmission over a two wire transmission line 10 is illustrated. This system includes two transceivers which in the preferred embodiment are substantially similar. Data for transmission over transmission lines 10 are received at node 12 from data terminal equipment or the like (not shown) by a transmitter 14 and by echo canceller 16. Transmitter 14 is in turn coupled to a hybrid transformer 18 which is also coupled to transmission line 10. The output of hybrid 18 is coupled to a summation block 20 as well as echo canceller 16. Echo canceller 16 is also coupled to summation 20 the output of which at node 22 drives a receiver 24. The hybrid output at node 26 supplies incoming data to echo canceller 16. Echo canceller 16 generates a signal which approximates the echo and delivers it at node 28 to summation block 20 for subtraction prior to processing by the receiver. The output of receiver 24 is then supplied to data terminal equipment or the like at node 30.

In a similar manner, data are received at node 32 by transmitter 34 and echo canceller 36. Transmitter 34 is coupled to a hybrid transformer 38 and echo canceller 36 is coupled to a summation block 40. The output of the summation block at node 42 drives a receiver 44. The output of hybrid 38 at node 46 supplies data from transmission line 10 to summation block 40 which subtracts an echo signal at node 48 prior to delivery to receiver 44. The output of receiver 44 at node 50 is coupled back to data terminal equipment (DTE) or the like.

The echo signal in a system as shown in FIG. 1 may be approximated by:

$$e(n) = \sum_{m=0}^{j} X(n-m)h(m)$$

Where:
- e(n) = the echo signal;
- x(i) = the ith sample of input data;
- h(i) = the ith sample of the unit impulse response of the transmission line; and
- j = the number of sample periods required for the impulse response to become negligibly small.

The communications arrangement of FIG. 1 is somewhat typical of baseband data communications over subscriber loops. Typical specifications for such an arrangement include a transhybrid loss of approximately 10 DB and line attenuation of 40 to 50 DB for a subscriber loop of approximately 3.2 kilometers. Of course these are not to be limiting as a wide variety of circuit specifications are possible. In the present circuit arrangement it is desirable to provide baseband communications at approximately 200 KBPS or greater while adequately suppressing echo to achieve at least 20 DB of signal to noise ratio.

Figure 2:
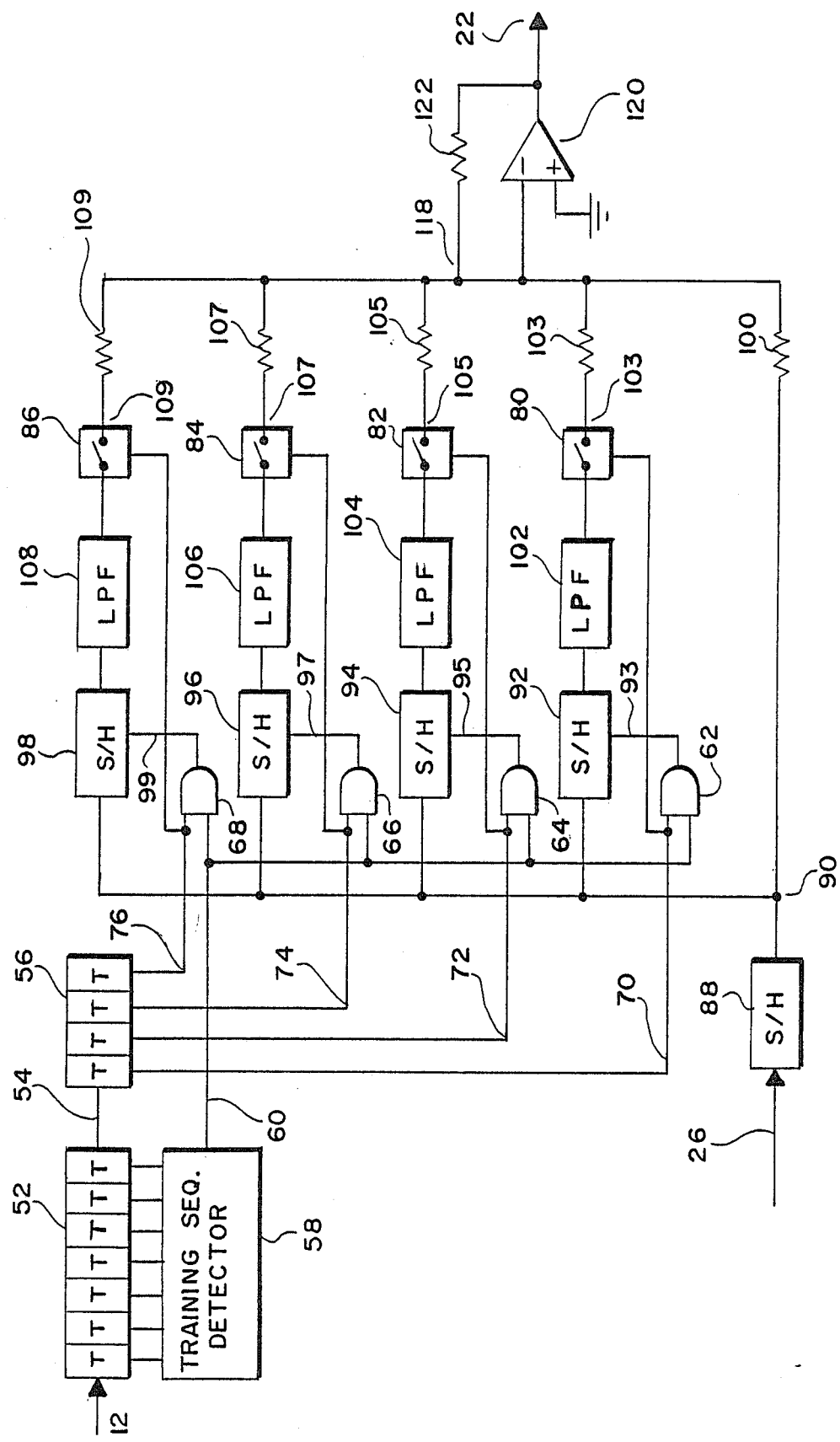
FIG. 2 shows a detailed block diagram of the echo canceller of the present invention.

Turning now to FIG. 2 a preferred embodiment of the present invention is illustrated wherein the echo canceller of FIG. 2 incorporates the summing block therein. In order to more readily relate the present invention back to the configuration of FIG. 1, nodes 12, 26 and 22 of the left-most transceiver of FIG. 1 are noted in FIG. 2. Data bits at node 12 are provided to a shift register 52 which in the present illustrative embodiment is shown as a seven stage shift register. The length of this shift register however is not to be limiting and is dependent upon various factors which will be understood by those skilled in the art in light of the present discussion. In this embodiment a seven stage shift register is utilized in order to detect a seven bit training sequence. The training sequence of the preferred embodiment is 0001000 but this is also not to be limiting. The output of shift register 52 at node 54 is provided to a second shift register 56 which in this embodiment is four bit shift register. The length of this shift register is also not to be limiting as it depends upon how many stages of storage are used in the present echo canceller as will be understood more fully after further consideration of the present invention. A training sequence detector 58 is coupled to the parallel output of shift register 52 and is utilized to detect the training pattern aforementioned. After a suitable delay following detection of the training sequence, training sequence detector 58 provides an output at node 60 to a plurality of AND gates. In the present invention four AND gates are utilized and designated generally 62, 64, 66 and 68. Shift register 56 provides a four bit parallel output at nodes 70, 72, 74 and 76 which supply logic signals to a second input of each of AND gates 62, 64, 66 and 68 respectively. In addition, nodes 70, 72, 74 and 76 are coupled to the control line of a plurality of analog switches designated 80, 82, 84 and 86.

In operation, an echo signal is received at node 26 by a high speed sample and hold circuit 88. The output of sample and hold 88 at node 90 is coupled to a plurality of four sample and hold circuits designated 92, 94, 96 and 98 respectively. Node 90 is also connected to one side of a register 100. The output of sample and hold 92 is coupled to a low pass filter 102 whose output is coupled to the input of analog switch 80. Similarly, the outputs of sample and hold circuits 94, 96 and 98 are coupled to low pass filters 104, 106 and 108, respectively. The outputs of which are coupled to inputs of analog switches 82, 84 and 86. Each of the outputs of the analog switches are coupled to a resistor which is preferably equal in value to a high degree of precision to resister 100. The output of analog switch 80 is coupled to a resiter 103, 82 is coupled to a resister 105, 84 is connected to a resister 107 and 86 is connected to a resister 109. The second terminal of resisters 103, 105, 107 and 109 are coupled together at a node 118.

Node 118 is coupled to the inverting input of an operational amplifier 120. Noninverting input of amplifier 120 is connected to a reference souce shown in FIG. 2 as ground. A feedback resistor 122 is connected between node 118 and the output of amplifer 120. The output of amplifer 120 is designated node 22.

In the present embodiment sample and hold circuits 88, 92, 94, 96 and 98 should be implemented utilizing high quality sample and hold configurations to achieve best echo cancellation. According to the present embodiment, inverting sample and hold circuits are used. Those skilled in the art will recognize that such sample and hold configurations are somewhat standard and readily developed according to the particular characteristics desired. Sample and hold circuits 92, 94, 96 and 98 are pulsed at their respective sample inputs by the outputs of AND gates 62, 64, 66 and 68 respectively in order to sample the signal level at node 90. The sample input of sample and holds 92, 94, 96 and 98 are designated 93, 95, 97 and 99 respectively. Not shown in FIG. 2 are the various clocking circuits which will be understood by those skilled in the art as necessary to the operation of such circuitry. Such clocking circuitry may lock to data provided at node 12 as is known by those skilled in the art.

Figure 3:
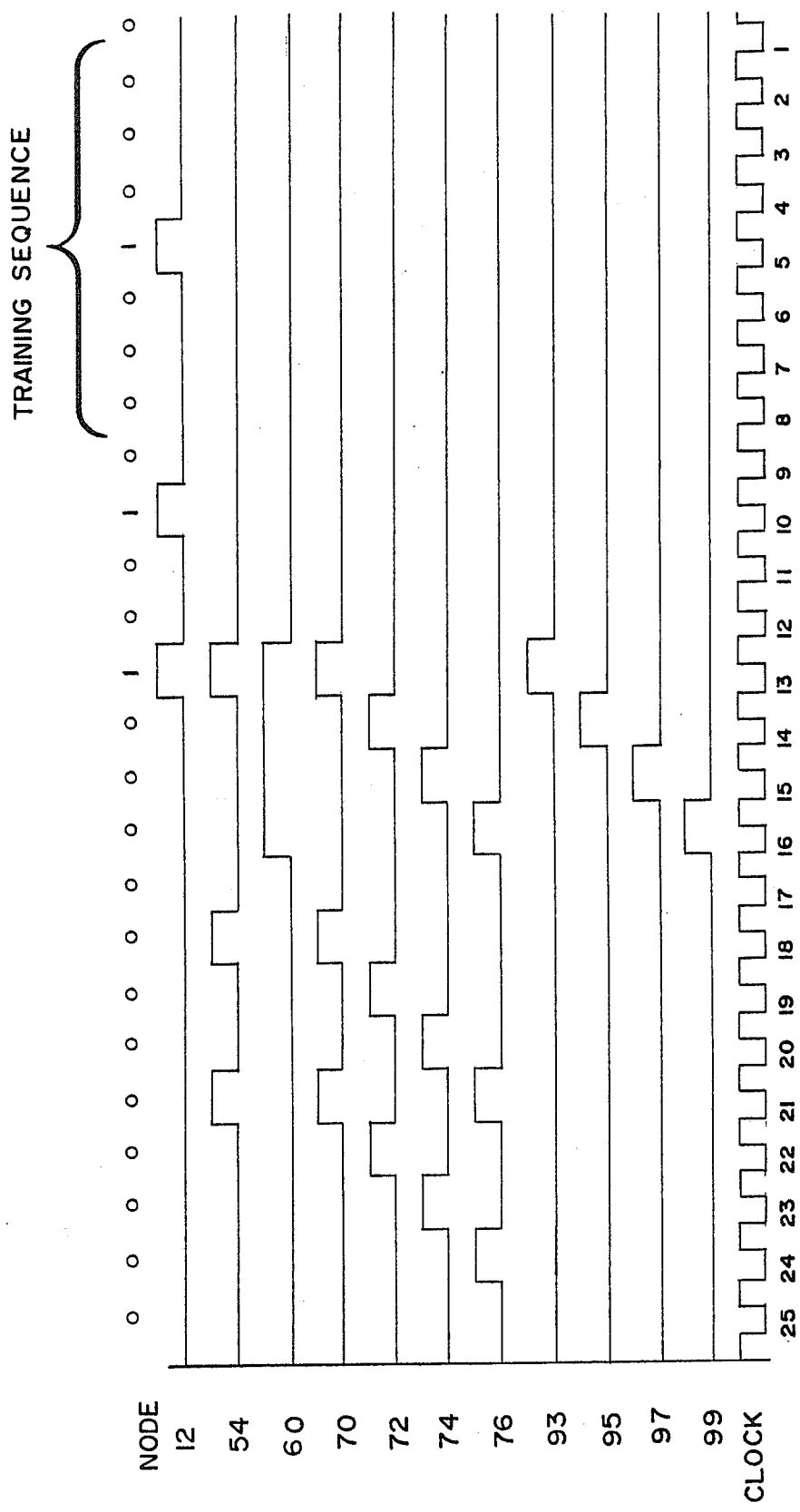
FIG. 3 is a timing diagram for the training sequence detector of FIG. 2 as well as other logic circuitry utilized in FIG. 2.
Figure 4:
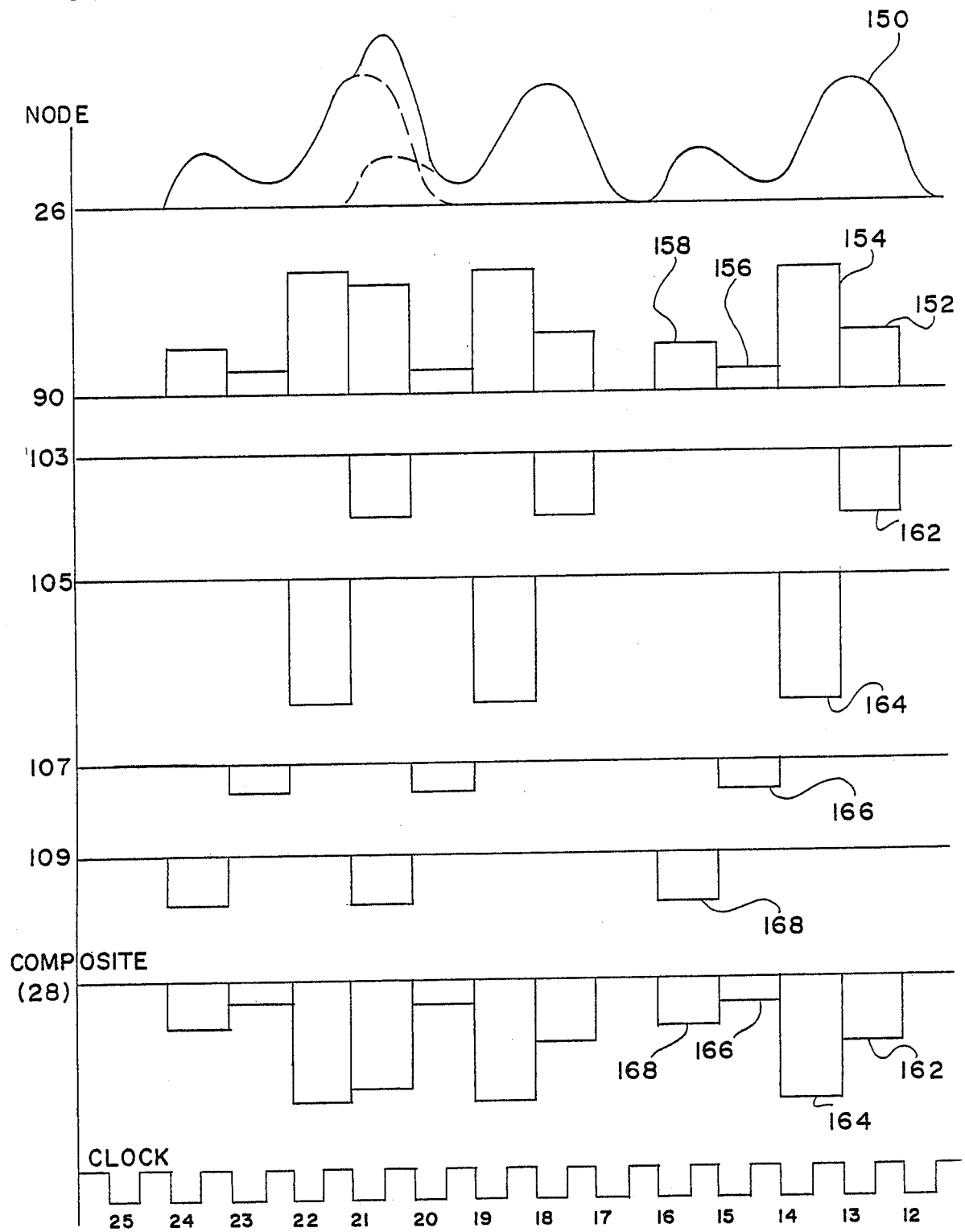
FIG. 4 is a timing diagram showing various waveforms utilized in the echo cancellation process of FIG. 2.

In general, operation of the present invention may be best understood by reference to FIG. 2 in conjunction with the timing diagram of FIG. 3 and the signal diagram of FIG. 4. The present embodiment shown in FIG. 4 assumes that an echo signal only contains four significant samples of echo information. That is, in four sample times the echo signal has significantly died out so that samples beyond four may be ignored. One skilled in the art will recognize that this assumption of four sample times determines the length of shift register 56 as well as the number of stages of samples and hold, low pass filter, analog switch and AND gate required to provide adequate echo suppression. In FIG. 3, the training sequence of 0001000 is received at clock cycles 1 through 7 where for purposes of the present explanation a clock cycle is defined as the time from one upward transition to the next upward transition. This identical pattern is passed by node 54 seven clock transitions later and is sequentially stepped through shift register 56 at node 70, 72, 74 and 76 over the next four clock intervals. At clock interval 12, the detector provides an output which is high for the next four clock transitions at which point it goes low until the next training sequence is received. As the binary one of the training sequence is passed through shift register 56 at the same time that training sequence detector 58 is providing a high output at line 60, nodes 93, 95, 97 and 99 are sequentially pulsed one at a time so that the signal at node 90 is selectively stored in each of sample and holds 92, 94, 96 and 98. In addition, as the binary one passes through shift register 56, its presence at nodes 70, 72, 74 and 76 enable analog switches 80, 82, 84 and 86 sequentially to provide the signals stored in each of the four respective sample and hold circuits 92, 94, 96 and 98 to the inverting input of amplifer 120 at node 118.

At this point in time, that is after clock transition 16, the equalizer has been trained by the training sequence and sample and holds 92, 94, 96 and 98 in conjunction with the capacitive elements in low pass filters 102, 104, 106 and 108 provide storage for a voltage level which is representative of an echo caused by a single binary one surrounded by binary zeros. At clock cycle 9 as well as clock cycle 12, binary ones are received at node 12. As will the training sequence, these binary ones are passed through shift register 52 and appear at node 54 seven clock cycles later. Over the next four clock cycles, this binary one is shifted to node 70, 72, 74 and 76 which in turn enable analog switches 80, 82, 84 and 86 so that a representation of the echo at each of those four time periods is passed on to the input of inverting amplifier 120. The original signal containing the echo at node 216 which is sampled and held at node 90 is also passed to inverting amplifier 120. Those skilled in the art will recognize that the resister configuration of node 120 is that of a summing inverting amplifier. In the preferred embodiment, sample and hold 88 as well as sample and hold circuits 92 through 98 are implemented utilizing inverting operational amplifers so that the signal passing through resister 100 has been inverted with the respect to the signal at node 26 once. After the summing with the echo representation at amplifer 120, it is restored at node 22 to its original polarity. The echo signals, however, are inverted twice at sample and hold 88 and one of sample and holds 92, 94, 96 or 98 prior to delivery to inverting amplifer 120 so that a total of three inversions are performed on the echo signal, whereas only two are performed on the echo plus data signal at node 26. In this manner, the summation block is implemented in a manner which provides subtraction of the stored echo signal from the echo plus data signal.

Turning now to FIG. 4, the analog waveforms passing through the circuit of FIG. 2 are shown. At node 26, the echo waveforms of the three binary ones transmitted at node 12 are shown. No incoming data at node 26 is assumed for purposes of this example. The clock signal shown at the bottom of FIG. 4 utilizes the same numbering as clock signal shown in FIG. 3 for convenience. Those skilled in the art will recognize that the transmitter 14 of FIG. 1 may include suitable delay to compensate for shift register 52 so that the signals simultaneously in FIG. 4 are not actually occurring at clock cycle 12 but actually some time later after a suitable delay has been introduced to synchronize the system.

The signal at node 26 is shown in FIG. 4 at the top with solid lines depicting the composite echo signal and with broken lines showing the individual components of echo signals which have an additive effect. At node 90, the sampled echo signal is shown as a rectangular approximation of the signal at node 26. For ease of comparison, the inversion which takes place at sample and hold 88 has been ignored. The right-most echo signal 150 represents the binary one of training sequence illustrated in FIG. 3. The four pulses labeled 152, 154, 156 and 158 are inverted and stored in sample and holds 92, 94, 96 and 98. As binary ones pass through shift register 56 the stored and inverted signals shown as 162, 164 166 and 168 are sequentially added to the signal at node 118 by selectively closing analog switches 80, 82, 84 and 86. For convenience the composite graph shown near the bottom of FIG. 4 is the summation of the signals at nodes 103, 105, 107 and 109. This composite signal does not actually exist at any point in the circuit of FIG. 2 but is analogous to the the signal at node 28 of FIG. 1.

When a plurality of ones occurs in the data signal, portions of the echo signals which overlap (representing intersymbol interference) such as shown at clock period 20 and the signals at nodes 103 and 109 in this example are added to recreate the echo approximation of the composite figure. An experimental model of the present invention provided approximately 38 DB of echo cancellation excluding 10 db transhybrid loss. It is believed that a great deal of optimization of the circuit is possible by using higher quality sample and hold circuits than those available for use in the experimental model. A higher quality operational amplifier and better resistor matching may also enhance performance. Computer simulations have indicated that 60 DB of echo cancellation is readily achievable utilizing ideal operational amplifer and sample and hold models. Those skilled in the art will recognize that the echo signal is stored as energy in the capacitors of the sample and hold circuit and the low pass filters. It is therefore important that high quality capacitors be utilized to avoid significant signal droop in these circuits. It will also be appreciated by those skilled in the art that more or less stages of storage may be utilized according to the situation at hand. For example, in a 3.2 kilometer subscriber loop having 40 to 50 DB of attenuation and having a data rate of 200 KBPS, an echo will last approximately 50 microseconds. At a nyquist sampling rate of 400 kilohertz the echo will have significant effect on 6 bits. In this instance, at least 6 stages of sample and hold and shift register 56 should be utilized in order to obtain good echo suppression.

According to one embodiment of the present invention a prearranged protocol may be established in full duplex two wire communications so that a training sequence is periodically transmitted to assure that the echo canceller is trained to line variations periodically. Such training may be required as frequently as every several milliseconds. It is desirable that far end transmissions be eliminated during this training period. It should be noted however that the according to the present embodiment, the training sequence may be detected as a random occurrence in incoming data. Consider for example the seven bit training sequence of the illustrative embodiment. Assuming that binary codes appear uniformly throughout the data then the frequency of occurrence of the 0001000 pattern is statistically 1/128. At a 200 KBPS data rate, the frequency with which the training sequence will occur within the data is approximately 1.5 kilohertz on the average. This frequency is adequate to assure that insignificant droop occurs in the sample and hold and low pass filter capacitors and frequent enough to assume that the channel parameter change no more frequently than every 100 milliseconds. If data on both sides of the link may be considered independent, the design of the low pass filters may be established at approximately 10 hertz to assure that adequate echo cancellation will occur with a reasonable frequency of update.

It should be noted that, although it is desirable to automatically train the echo canceller by detecting the statistical occurrence of a training pattern in a data stream, this may not be possible in many instances. A protocol should therefore be devised to assure adequate updating of the echo canceller even if training is carried out statistically as described.

Of course the cutoff frequency of 10 hertz which has been stated above is not to be considered limiting in any way as the present echo canceller has not been fully optimized. The filters should be designed to provide averaging of far end data while still allowing response to low frequency changes in line conditions. Those skilled in the art will recognize various improvements and refinements which may be used in conjunction with the present echo canceller to enhance echo cancellation without the necessity of expensive computational power and without any need whatsoever for analog to digital and digital to analog conversion. As such, the present invention may be readily implemented in integrated circuit form for use in at a wide variety of frequencies at very low cost.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. An apparatus for conditioning an echo canceller, comprising:
    data input means for receiving digital input data for transmission over a transmission medium;
    receiving means for receiving digital data corrupted by an echo signal from said transmission medium;
    an echo canceller operatively coupled to said transmission medium said echo canceller including storing means for storing characteristics of said transmission medium;
    detecting means, responsive to said input data, for detecting a predetermined digital data pattern occurring in said input data, said predetermined data pattern being an ordinary part of said input data which occurs from time to time without being specifically transmitted for training purposes; and
    training means for training said echo canceller by storing characteristics of said transmission medium in said storing means in response to said detecting means whenever said detecting means detects said predetermined digital data pattern.

2. A method of training an echo canceller, comprising the steps of:
    detecting a predetermined digital data pattern forming a part of streams of data to be transmitted, said predetermined data pattern being an ordinary part of said input data which occurs from time to time without being specifically transmitted for training purposes;
    receiving an echo signal resulting from transmission of said predetermined digital data pattern; and
    training said echo canceller by storing samples of said echo signal for use as a representation of transmission line characteristics in response to said detecting step.

* * * * *